(12) United States Patent
Nagara et al.

(10) Patent No.: US 9,608,739 B2
(45) Date of Patent: Mar. 28, 2017

(54) SYSTEM AND METHOD FOR A BLENDED SIGNAL

(71) Applicant: Visteon Global Technologies, Inc., Van Buren Township, MI (US)

(72) Inventors: Wes A. Nagara, Commerce Township, MI (US); Theodore Charles Wingrove, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 130 days.

(21) Appl. No.: 14/054,212

(22) Filed: Oct. 15, 2013

(65) Prior Publication Data

US 2015/0103816 A1    Apr. 16, 2015

(51) Int. Cl.
*H04B 15/00*     (2006.01)
*H04W 76/02*     (2009.01)
*H04W 88/06*     (2009.01)

(52) U.S. Cl.
CPC .......... *H04B 15/00* (2013.01); *H04W 76/025* (2013.01); *H04W 88/06* (2013.01)

(58) Field of Classification Search
None
See application file for complete search history.

(56) References Cited

U.S. PATENT DOCUMENTS

| 8,374,196 B2 | 2/2013 | Stockstad |
| 8,417,187 B2 | 4/2013 | Chen et al. |
| 2007/0060055 A1 | 3/2007 | Desai et al. |
| 2007/0197256 A1* | 8/2007 | Lu et al. ............. 455/552.1 |
| 2012/0275219 A1 | 11/2012 | Abedifard |
| 2012/0275319 A1* | 11/2012 | Peiris ............. H04M 1/7253 370/252 |
| 2012/0294396 A1 | 11/2012 | Desai |
| 2013/0283351 A1* | 10/2013 | Palin et al. ............. 726/4 |

FOREIGN PATENT DOCUMENTS

| EP | 2494418 A1 | 9/2012 |
| EP | 2384601 B1 | 11/2012 |
| GB | 2492348 A | 1/2013 |
| KR | 1012000976 A1 | 11/2012 |
| WO | 2011053357 A1 | 5/2011 |

* cited by examiner

*Primary Examiner* — Diane Lo
(74) *Attorney, Agent, or Firm* — Dickinson Wright PLLC

(57) ABSTRACT

The system includes a controller communicatively connected to a first and second device. The first and second devices have multiple wireless technologies capabilities, such as Bluetooth, Wi-Fi, and other known wireless technologies. The controller is configured to combine two signals generated from the wireless technologies into a single blended signal to transmit data from the first device to the second device or vice versa. The wireless technologies may be selected via a user interface which is communicatively connected to one of the first and second devices. Additionally, the wireless technologies may be selected using voice command or automatically selected by the type of data an operator designates. The controller is configured to combine two signals generated from the wireless technologies into a blended signal as well as allow two-way communication between the first and second device.

19 Claims, 8 Drawing Sheets

SYSTEM AND METHOD FOR A BLENDED SIGNAL

BACKGROUND OF THE INVENTION

Wireless communication and data transmission are well known. Typically, these communications and transmissions are transferred by using either a one-way system which allows data to transmit from one device to another or a two-way system which allows bi-directional transmission of data between multiple devices. Accordingly, two-way communication is preferred due to an ability to exchange information between multiple devices immediately. In the area of two-way wireless communication, systems and methods of communication advance as different technologies and devices advance. This includes the ability to transfer data utilizing different wireless technologies such as Bluetooth or Wireless Local Area Network (WLAN) as known as Wi-Fi.

Advances in technology have also caused components of wireless communication devices to be smaller in size which has created a demand to utilize different wireless technologies within the same circuitry as well as transmitting data over at the same time. Several solutions have been contemplated to address this demand, however, none allow for the transmission of data using multiple wireless technologies with single signal.

SUMMARY

A system and method for wireless communication configured to combine and transmit data utilizing two wireless technologies between a first and second device wherein the wireless technologies may be selected via a user interface is provided.

The system includes a controller communicatively connected to a first and second device. The first and second devices are equipped with two wireless technologies such as Bluetooth, Wi-Fi, and other known wireless technologies. The wireless technologies may be selected via a user interface which is communicatively connected to one of the first and second devices. Additionally, the wireless technologies may be selected using voice command or automatically selected by the type of data an operator designates. The controller is configured to combine two signals generated from the wireless technologies into a single blended signal as well as allow two-way communication between the first and second device.

The controller is configured to command one wireless technology to substitute the blended signal with another when the other wireless technologies experience interference.

The aspect disclosed herein provides a method for combining and transmitting two signals from two wireless technologies having a first device, controller, second device, and user interface. The controller is configured to perform the operation of selecting two wireless technologies to be used for data transmission, combining two signals generated based on the selection of the two wireless technologies into a single blended signal, and transmitting data between the first and second device via the blended signal.

The method may further comprise substituting the blended signal with the signal generated by one of the two wireless technologies to prevent transmission failure when the other experiences interference.

The aspects disclosed herein provide a method for combining and transmitting signals from two wireless technologies having a first device, a controller, and a second device.

The method comprises detecting interference interrupting operation of one of the two wireless technologies, and substituting the other wireless technology for the one experiencing interference to maintain data transmission.

The aspects disclosed herein provide various advantages. For example, an operator may operate multiple devices with various types of wireless technology in a simplified manner by using one interface, instead of switching between multiple devices. Likewise, the system provides for higher data transfer rates as well as greater capacity or Bandwidth for the transmission of information, allowing the operator to transmit more data faster based on the use of two or more wireless technologies. Similarly, the system and methods reduce interference in data transmission caused by phenomenon or environmental conditions by substituting signals of one wireless technology for another when the other is interrupted by interference.

BRIEF DESCRIPTION OF THE DRAWINGS

The above advantages and other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Detailed examples of the present invention are disclosed herein; however, it is to be understood that the disclosed examples are merely exemplary and may be embodied in various and alternative forms. It is not intended that these examples illustrate and describe all possible forms of the invention. Rather, the words used in the specification are words of description rather than limitation, and it is understood that various changes may be made without departing from the spirit and scope of the invention.

The aspects disclosed herein allow the operator to operate multiple devices such as a smart phone and vehicle module by using one interface, instead of switching between both devices. Additionally, allows for high data transfer rates or greater Bandwidth since multiple wireless technologies are working in concert to transmit the data and prevents interference from interrupting data transmission.

Figure 1:
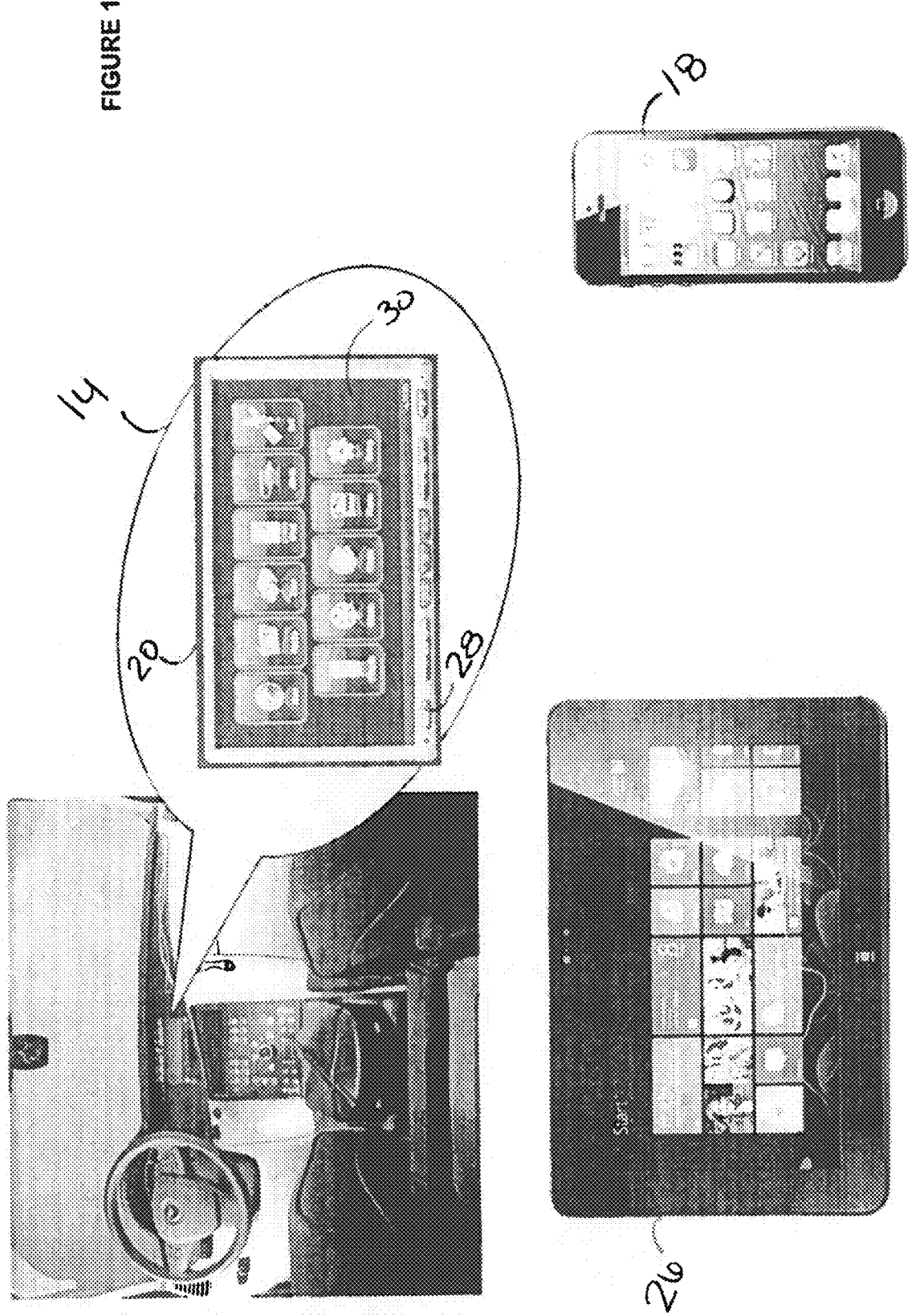
FIG. 1 illustrates an example of a first, second, and third device.

FIG. 1 illustrates an example of a first, second, and third device 14, 18, 26. The first, second, and third devices 14, 18, 26 may be wired or wireless devices and include, but are not limited to various vehicle modules, cellular phones or smart phones, and smart devices such as tablets, laptops, headphones, keyboards, printers, or other portable devices operating in various platforms. Each device may come equipped with a processing unit, integrated circuits having multiple sensors and antennas capable of supporting wireless communications or wired communications, as well as a variety of application such as Wi-Fi, Bluetooth, GPS, video calls and the like. Typically, these devices are operated through the use of a user interface 20 having selectable push buttons 28 or an LCD touch screen 30 as shown in FIG. 1. Operation of user interface 20 is not limited to selection via push buttons 28 or touch screen 30 but may further include voice command and the like. The user interface 20 allows an operator to select different applications depending on their actual need as well as control the device as will be further described in FIGS. 2 and 6.

As those of ordinary skill in the art will understand various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Figure 2:
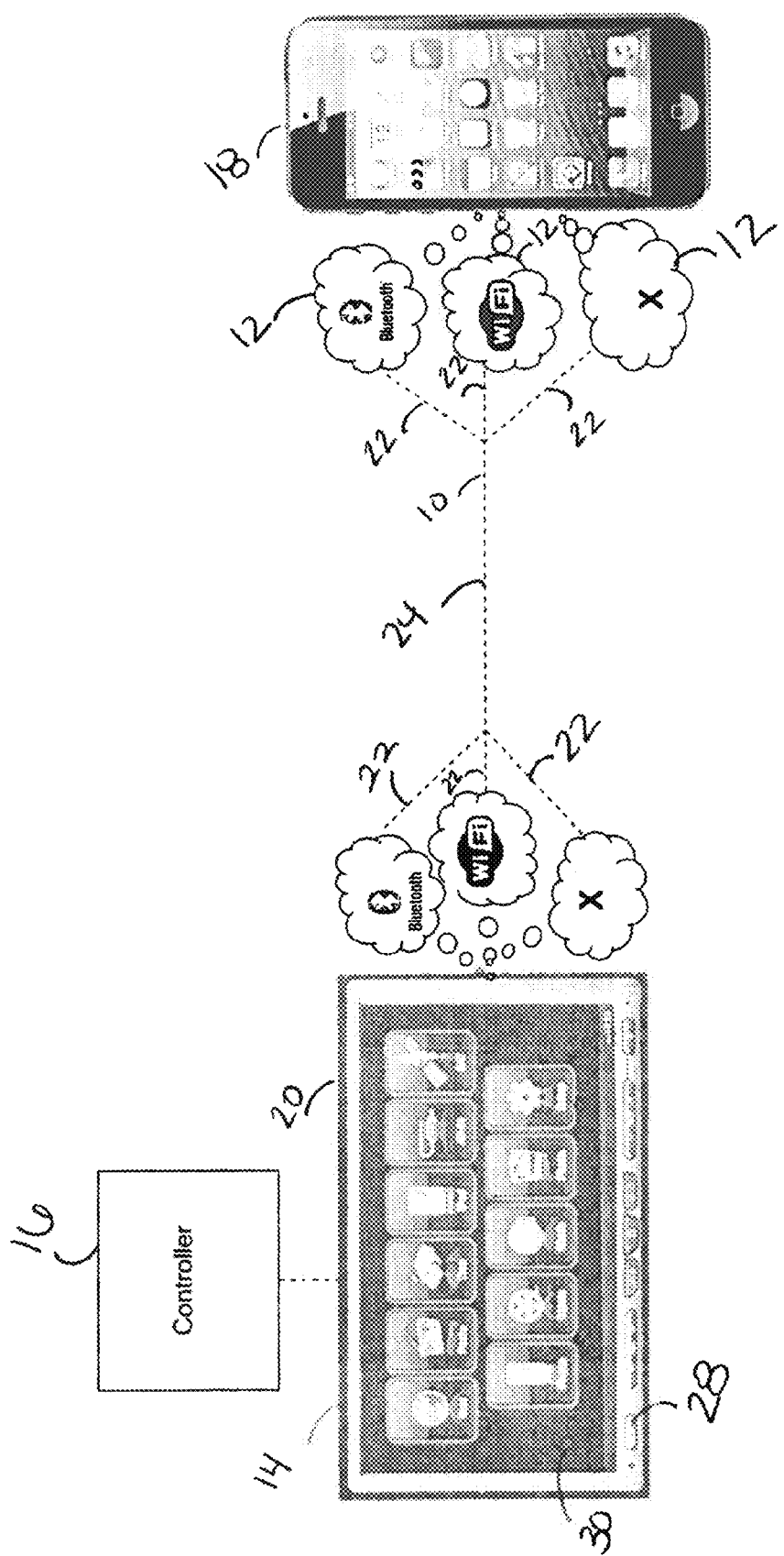
FIG. 2 illustrates an example of a system for wireless communication configured to combine and transmit data employing two wireless technologies.

With respect to FIG. 2, the illustration depicts a system for wireless communication configured to combine and transmit data 10 utilizing two wireless technologies 12. Data 10 comprises data such as a stream of music, movies, vehicle information, or other types of information as well as communications such as commands or other types of media. The system includes a controller 16 communicatively connected to a first and second device 14, 18. Each device 14, 18 may be equipped with two wireless technologies 12 as well as a user interface 20. The two wireless technologies 12 may be selected via the user interface 20 or through voice command, or software. The controller 16 is configured to combine two signals 22 generated by the wireless technologies 12 into a blended signal 24 and transmit the blended signal 24 between the first and second device 14, 18. For example, an operator of this system may require to stream internet radio available on their smart phone through their vehicle. The software automatically, hardware signal detection, or operator may select Bluetooth and Wi-Fi to stream the music or the operator may select the Internet radio application on their smart phone, which may automatically designate Bluetooth and Wi-Fi to stream the music from the smart phone to the vehicle module within the vehicle.

However, at times during data 10 transmission, interference may disrupt one type of wireless technology 12, but not others due to the specific specifications of that technology such as Bluetooth or Wi-Fi. The interference may be caused by phenomena or environmental conditions such as weather or certain geographical locations having poor reception. The aspects of this system provide that if one of the selected wireless technologies 12 experiences interference during data 10 transmission, the controller 16 commands the other wireless technologies 12 to act as a substitute and generate the signal 22 to maintain transmission between the first and second device 14, 18. For example, if the operator is using Wi-Fi and Bluetooth to stream music from the smart phone to the vehicle module in their vehicle and the Wi-Fi signal drops due to interference based on the vehicle's geographical location, the controller 16 instructs the Bluetooth signal to act as a substitute and maintain data 10 transmission. In other words, the Bluetooth signal will continue to stream music from the smart phone to the vehicle module without the assistance of Wi-Fi.

Additionally, the controller 16 allows for two way communication in transmitting and receiving data 10 via the blended signal 24 between the first and second device 14, 18 or vice versa.

Types of wireless technologies 12 may include Bluetooth and Wi-Fi as well as other known wireless technologies. Other known wireless technologies may encompass one type of wireless technology or may encompass various types of present and future wireless technology. Other known wireless technologies includes, but is not limited to Global Positioning System (GPS), mobile virtual private network (mobile VPN), long term evolution (LTE), digital enhanced cordless telecommunications (DECT), enhanced Voice-Data Optimized (EVDO), general packet radio service (GPRS), high speed packet access (HSPA), high capacity spatial division multiple access (iBurst), Li-Fi, multichannel multipoint distribution service (MMDS), worldwide interoperability for microwave access (WiMax), Wireless USB and other technologies capable of wireless communication. To designate the wireless technologies 12, an operator may select the type of wireless technologies 12 by using the selectable push buttons 28 or touch screen 30 of the user interface 20 to turn one of the wireless technology 12 ON or OFF. Any of the following combinations will satisfy the selection of two wireless technologies 12: Bluetooth and Wi-Fi, Bluetooth and other known wireless technologies, and Wi-Fi and other known wireless technologies, for example.

In another example, an operator of the devices 14, 18 may designate the type of wireless technologies 12 by selecting the type of data 10 via the user interface 20. In other words, the type of data 10 designated dictates the selection of type of wireless technology 12. For instance, if the operator desired to stream video between the first and second device 14, 18, and selects an application on the user interface 20 for video streaming, then the device may automatically chose Bluetooth and Wi-Fi or Wi-Fi and other known wireless technologies to transmit the data 10 between the first and second device 14, 18.

After the type of data 10 or wireless technologies 12 has been selected, signals 22 are generated representative of the data 10 and are parsed and encrypted for secure transmission. The controller 16 then combines the parsed and encrypted signals 22 into a single blended signal 24. The controller 16 transmits the blended signal 24 between the first and second device 14, 18. However, during transmission of the blended signal 24 phenomena or environmental conditions surrounding the first and second device 14, 18 may cause interference. This interference may disrupt the operation of one of the wireless technologies 12. To combat the interruption, the controller 16 may instruct the other wireless technologies 12 to act as a substitute and generate the signal 22 to maintain transmission between the first and second device 14, 18. In other words, if Bluetooth fails due to interference during data 10 transmission, the controller 16 may instruct Wi-Fi or other known wireless technologies to transmit the data 10 instead.

In addition to preventing interference, the use of two wireless technologies 12 to create the blended signal 24 may generate a larger bandwidth for the transmission of data 10 between the first and second device 14, 18. Put differently, the first and second device 14, 18 may have the ability to transmit larger quantities of data 10 across the blended signal 24 because the use of the two wireless technologies 12 increases bandwidth capacity. Individually, each wireless technology 12 has a certain bandwidth capacity based on the technologies specification. As a result, the respective bandwidths increase since multiple wireless technologies 12 are used together.

In another example, the third device 26 is communicatively connected to the controller 16 having two wireless technologies 12. The third device 26, as shown in FIG. 1 and described above, may communicate with either the first or second device 14, 18, or both.

Figure 3:
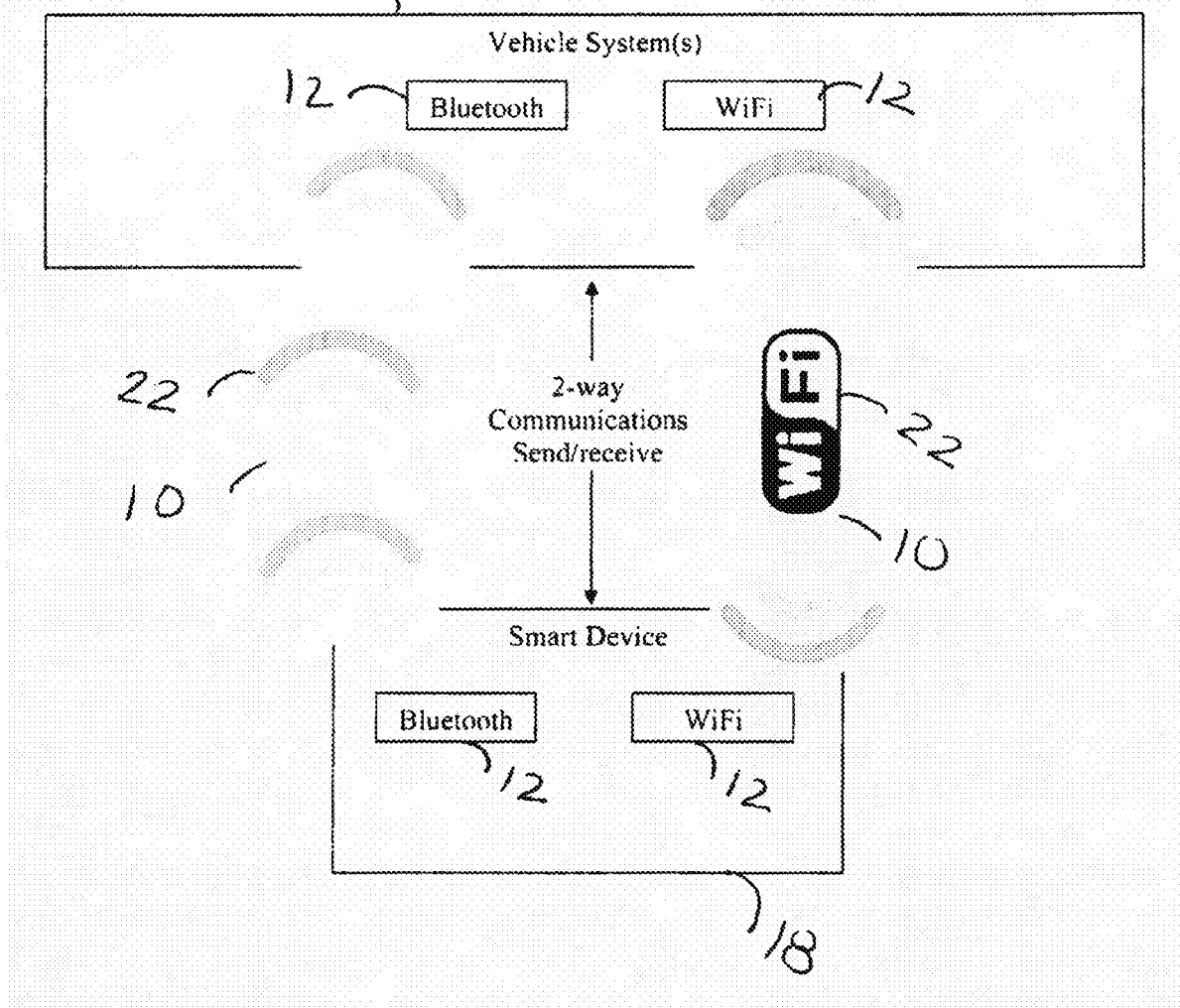
FIG. 3 illustrates a block diagram depicting an example of multiple signals transmitting data using two wireless technologies.
Figure 4:
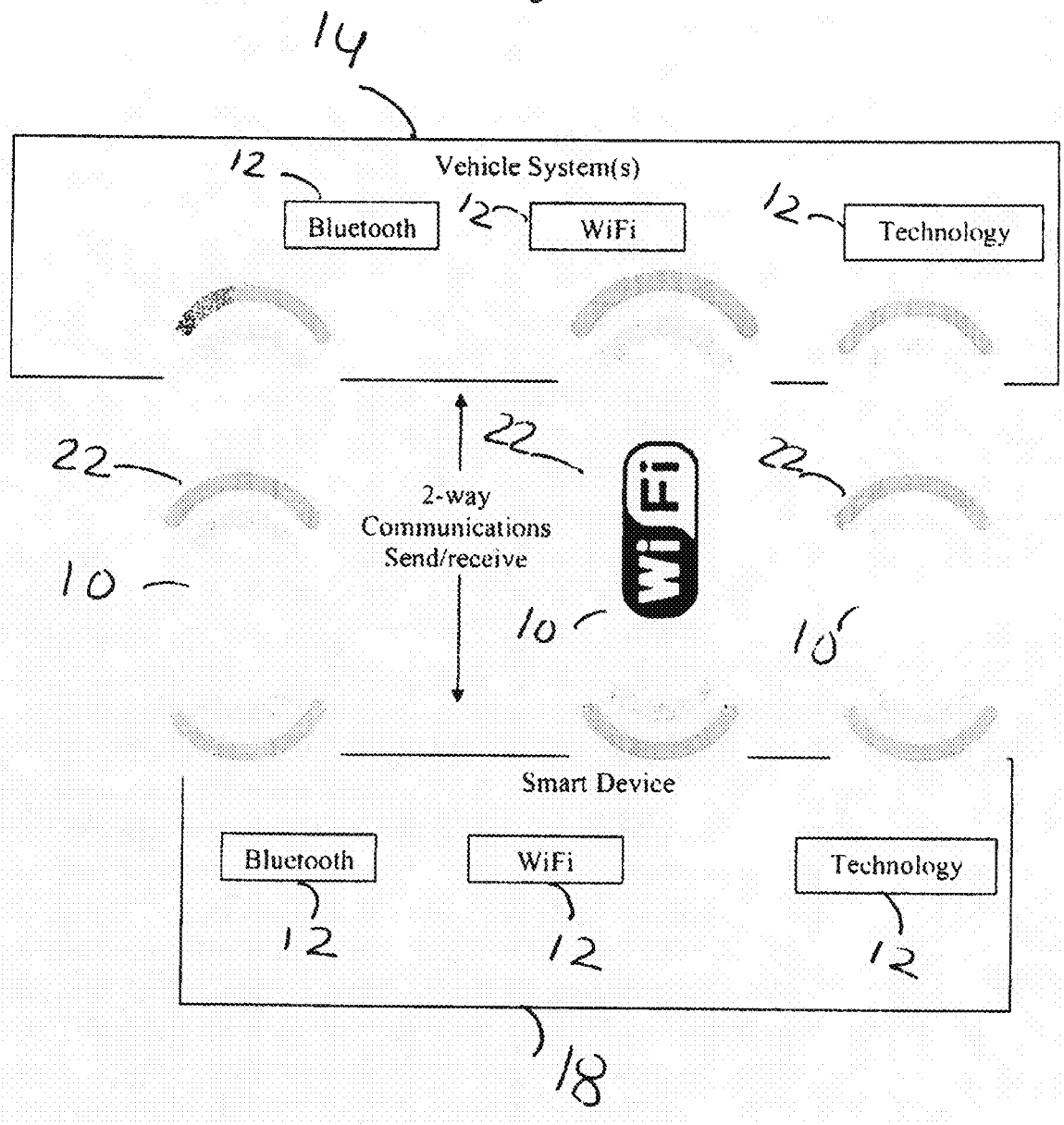
FIG. 4 illustrates a block diagram depicting another example of multiple signals transmitting data using two wireless technologies.
Figure 5:
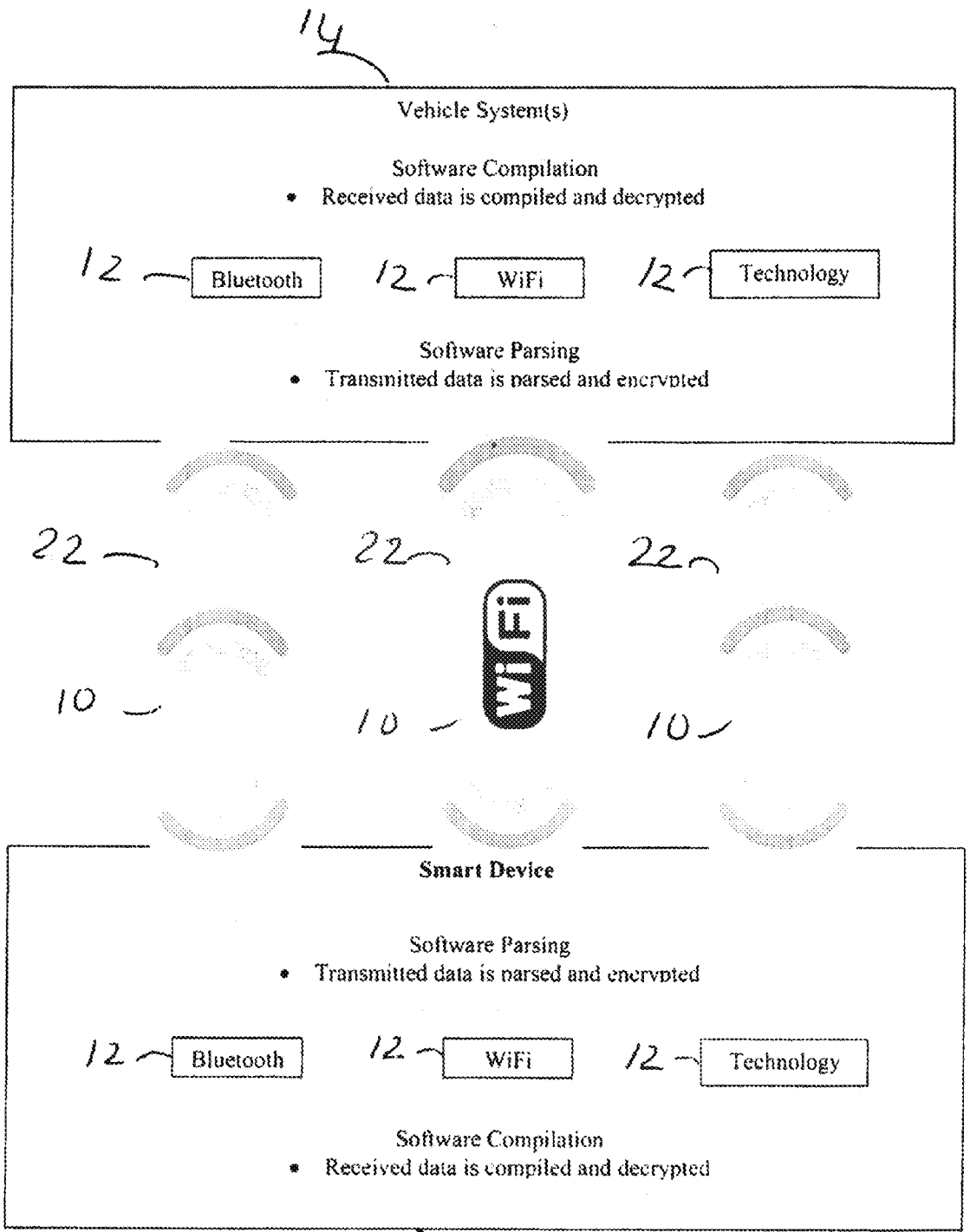
FIG. 5 illustrates a block diagram depicting an example of multiple signals transmitting data using two or more wireless technologies.

FIG. 3-5 illustrates a block diagram depicting examples of a system using multiple signals 22 and wireless technologies 12 to transmit data 10. The system has a first device 14, a controller 16 (not shown), and a second device 18. As described above, the controller 16 is communicatively connected to the first device 14 and the second device 18. Each device 14, 18 may be equipped with two or more wireless technologies 12 as well as a user interface 20 (not shown). The two wireless technologies 12 as well as the data 10 to be transmitted may be selected via the user interface 20 or through voice command, or automatically through software. Once the wireless technologies 12 and data 10 have been selected, the first device 14 may transmit the data using two or more signals 22. For example, as shown in FIG. 3, data 10 may be transmitted using Bluetooth and Wi-Fi simultaneously. In other words, the two or more wireless technologies 12 may coordinate with each other and transmit data 10 using multiple signals 22.

Additionally, as illustrated in FIG. 5, before the data 10 is transmitted the controller 16 (not shown) is configured to parse and encrypt the data 10 to each specific wireless technology 12. After the data 10 has been transmitted from the first device 14 to the second device 18, the data 10 is compiled and decrypted.

Figure 6:
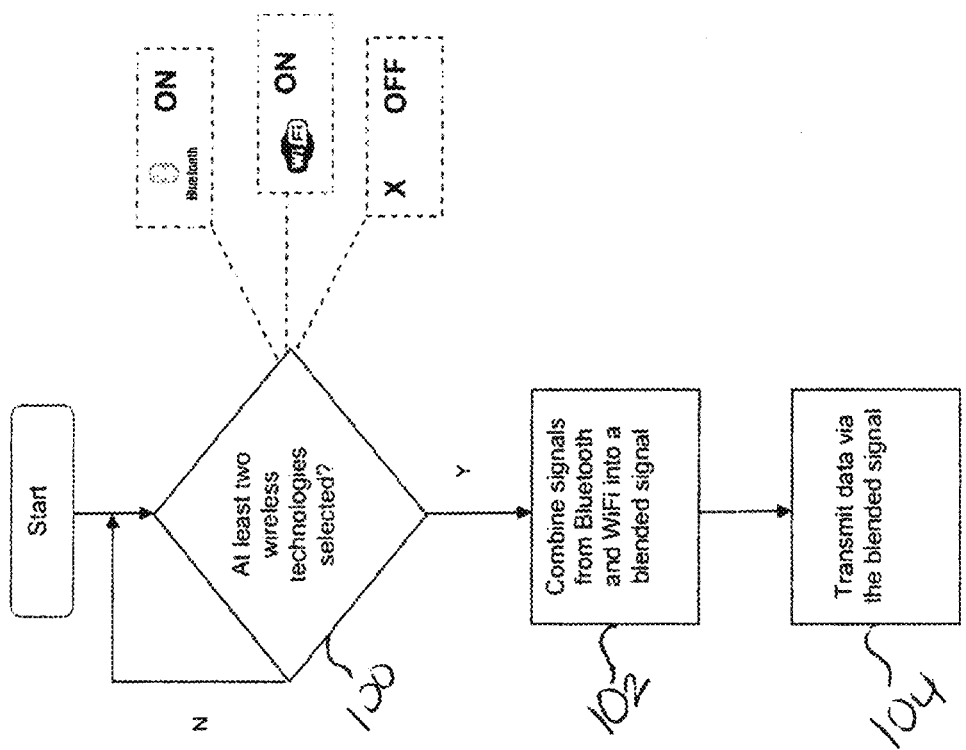
FIG. 6 illustrates a flowchart depicting an example of a method for preventing interference in during data transmission using two wireless technologies.

FIG. 6 illustrates a flowchart depicting an example of a method for combining and transmitting two signals 22 generated by two wireless technologies 12 having a first device 14, controller 16, second device 18, and user interface 20. The method includes the operation of selecting 100 two wireless technologies 12 to be used for data 10 transmission, combining 102 two signals 22 generated into a blended signal 24 based on the selection of wireless technologies 12, and transmitting 104 data 10 between the first and second device 14, 18 via the blended signal 24.

As described above, an operator may select the wireless technologies 12 via selective push buttons 28 or touch screen 30 within the user interface 20. When wireless technologies 12 are selected, such as Bluetooth and Wi-Fi as shown in FIG. 6, the controller 16 will recognize two wireless technologies 12 as ON. Alternatively, the operator may unselect or turn OFF any wireless technologies 12 previously used through the user interface 20. For example, if the operator has previously utilized Bluetooth and other known wireless technologies 12 for the use of streaming GPS directions between the first and second device 14, 18 and the user desires to now stream video using Bluetooth and Wi-Fi, the operator may turn OFF other known wireless technologies by de-selecting it via the user interface 20. The controller 16 is configured to recognize the signals 22 generated based on the selected wireless technologies 12 and combines or multiplexes the signals 22 into a single blended signal 24. This blended signal 24 allows the wireless technologies 12 to work in concert with each other like a pipeline.

In another example as described with respect to FIG. 2, selection is not limited to choosing wireless technologies 12 by push buttons 28 or touch screen 30 within the user interface 20. As described in greater detail in FIG. 74, selection of the wireless technologies 12 may also occur internally when an operator determines and designates on the user interface 20 the type of data 10 to be transmitted between devices 14, 18. In this example, the controller 16 is configured to determine the type of wireless technologies 12 necessary for effective data 10 transmissions. In determining this, the controller 16 may consider various factors such as the data 10 to be transferred, size of the data 10, rate of transfer required, and the like. The consideration of these factors may result in a higher data 10 transfer rates or larger bandwidth.

Figure 7:
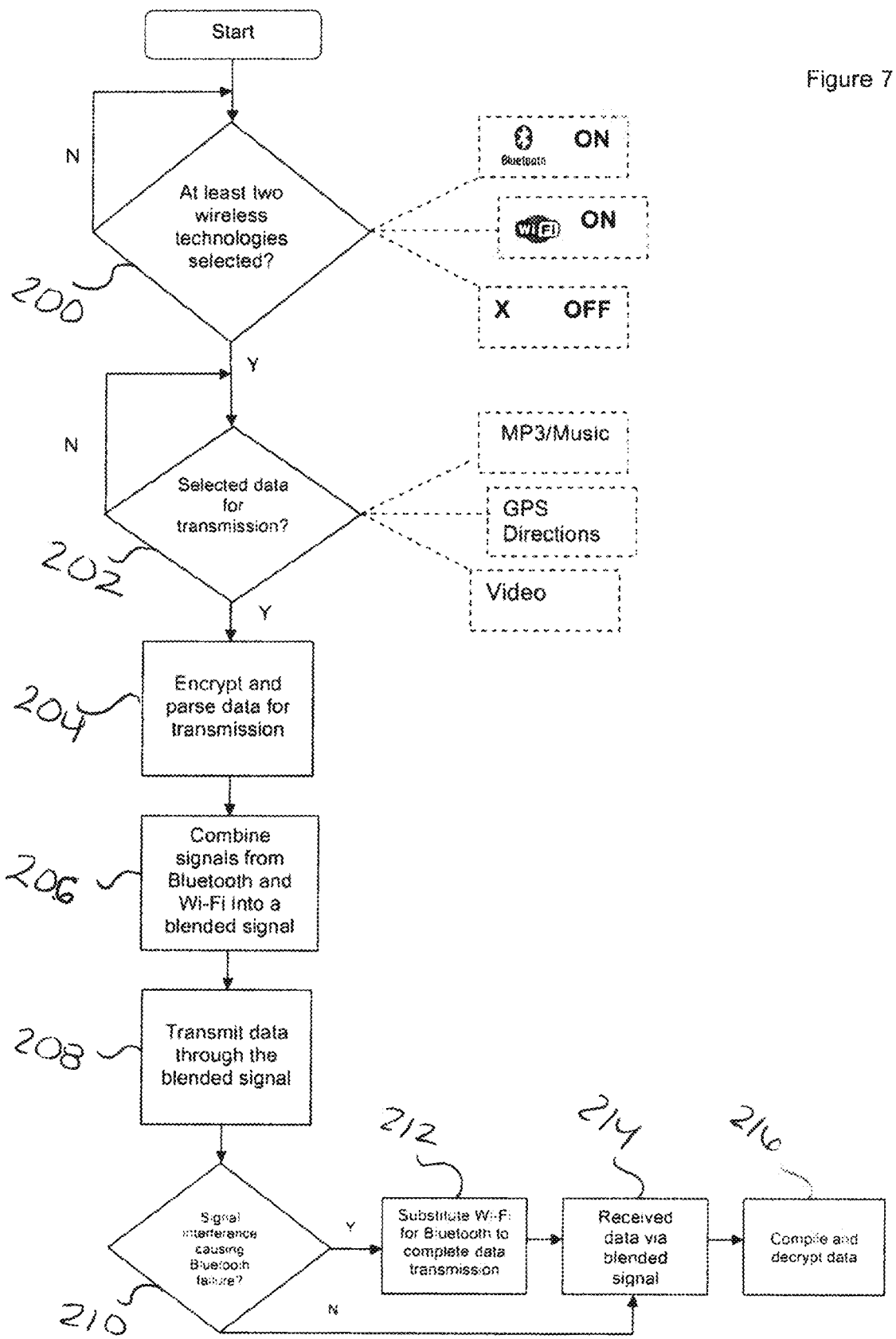
FIG. 7 illustrates a flowchart depicting an example of a method for combining and transmitting two signals generated by two wireless technologies.

With respect to FIG. 7, a flowchart illustrates a method for combining and transmitting two signals 22 generated by two wireless technologies 12 having a user interface 20 and a controller 16 communicatively connect between the first and second device 14, 18 in greater detail. The method includes selecting two wireless technologies 12 to be used for data 10 transmissions 200. As discussed above in FIG. 6, the operator may select the wireless technologies 12 via button press 28 or touch screen 30 with the user interface 20. Additionally, the wireless technology 12 may be designated on the user interface 20 as ON. For example, if an operator selects Bluetooth and Wi-Fi data transmission, then a portion of the screen within the user interface 20 reflect that Bluetooth and Wi-Fi are turned ON.

Once the wireless technologies 12 are recognized as selected, the operator selects the type of data 10 for transmission 202. The selection of data 10 may include the operator activating an application with the vehicle module or on their cellular or smart phone through the use of push buttons 28 or touch screen 30 within the user interface 20, or through voice command pre-programmed in the device 14, 18, and 26. As shown in FIG. 7 such applications may include MP3 for streaming music, global positioning for driving directions, video streaming and any other application which is pre-set on the device or downloadable to devices 14, 18, and 26.

One skilled in the art understands that the illustration in FIG. 7 is one example of the method which is not limiting. However, one skilled in the art also appreciates there are alternatives as described above in FIG. 6. In an alternative example, the operation of the selection of data 10 for transmission may precede the selection of the wireless technology 12. In an example, after the data 10 is selected, the operator or controller 16 may designate the types of wireless technology 12 to utilize as previously described in regards to FIG. 6. For instance, if the operator desires to stream music between the first and second device 14, 18, the operator may activate that specific application, and then may turn on Bluetooth and Wi-Fi to complete the transmission. Likewise, the controller 16 may automatically designate and activate Bluetooth and Wi-Fi to complete the transmission, when the operator selects their desired application.

After the data 10 and wireless technologies 12 are selected, the data 10 is parsed and encrypted for transmission 204. During this operation, the data 10 is analyzed and encoded to the specific wireless technologies 12 being utilizing. For instance, if the data 10 is streaming music using Bluetooth and Wi-Fi, the music will be analyzed and encoded to each wireless technology 12 (i.e. analyzed and encoded for Bluetooth as well as analyzed and encoded for Wi-Fi). Multiple signals 22 comprising the encoded data 10 are then combined or multiplexed through the controller 16 into a blended single 24 for transmission 206.

The blended signal 24 is transmitted 208 and received 214 between the first and second device 14, 18. Transmitting and receiving the blended signal 24 may be accomplished through the use of a receiver or an antenna located within the first and second device 14, 18, as well as through wired technology such as a USB cable and the like. The transmission and receiving of the blended signal 24 allows for two-way communication. During transmission, the controller 16 is configured to detect if any of the wireless technologies 12 within either device 14 and 18 is experiencing transmission failure due to interference caused by phenomena or environmental conditions 210. If the controller 16 detects transmission interference within one of the wireless technologies 12 such as Bluetooth, the controller 16 will instruct another wireless technology 12 such as Wi-Fi to complete the data 10 transmission. In other words, the controller 16 will instruct the other wireless technology 12 not experiencing failure due to interference to maintain the transmission. If the controller 16 does not detect failure of the wireless technology 12 due to interference, as shown in FIG. 4 the data is received via the blended signal 214.

Once the blended signal 24 is received by the device 14, the controller 16 compiles and decrypts the blended signal 24 specifically to each of the wireless technologies 12 used during transmission 216. For instance, if the transmitted data 10 is parsed and encrypted using Wi-Fi and other known wireless technologies, the received data 10 will be compiled and decrypted using Wi-Fi and other known wireless technologies.

Figure 8:
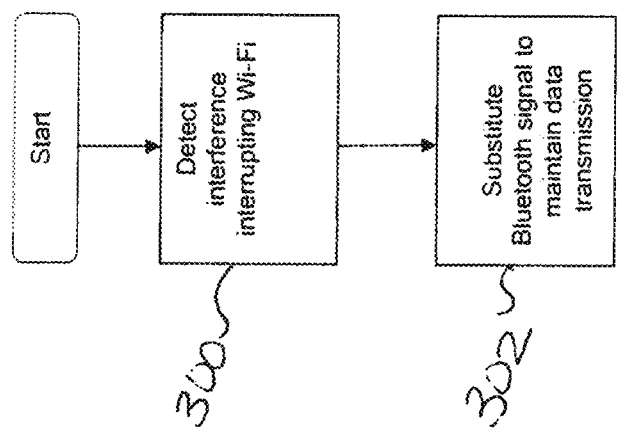
FIG. 8 illustrates a flowchart depicting an example of a method for combining and transmitting two signals generated by two wireless technologies.

FIG. 8 illustrates a flowchart depicting an example of a method for preventing interference when combining and transmitting signals from two wireless technologies 12 having a controller 16 communicatively connected to a first and second device 14, 18. The method including the operation of detecting interference interrupting the operation of one of the two wireless technologies 300, and substituting the other wireless technology 12 for the one experiencing interference 302. In substituting the other wireless technology 12, data 10 transmission between the first and second devices 14 and 18 is maintained.

The example disclosed above may transmit or receive the data 10 via the first or second devices 14, 18. Additionally, the examples disclosed above may be implemented through the use of hardware, software, or a combination of both. Specifically, in regards to software, the application may be pre-set in the device or the application may be downloadable to each device. Moreover, as technology further advances software updates may be available to each device to integrate and incorporate new technology into the system.

While examples of the invention have been illustrated and described, it is not intended that these examples illustrate and describe all possible forms of the invention. Rather, the words used in the specification are words of description rather than limitation, and it is understood that various changes may be made without departing from the spirit and scope of the invention. Additionally, the features and various implementing embodiments may be combined to form further examples of the invention.

What is claimed:

1. A system for wireless communication to combine and transmit data employing two wireless technologies, comprising:

a controller communicatively connected a first device and a second device, the first and second devices having two wireless technologies, and a user interface to provide a selection, wherein the two wireless technologies may be selected via a user interface communicatively connected to one of the first device and the second device, and the controller combines two signals from the two wireless technologies into a single blended signal.

2. The system of claim 1, wherein the first device is a vehicle module.

3. The system of claim 1, wherein the second device is a smart phone.

4. The system of claim 1, wherein the user interface includes selective push buttons.

5. The system of claim 1, wherein the user interface includes an LCD touch screen.

6. The system of claim 1, wherein the controller is configured to instruct one of the two wireless technologies to act as a substitute, and to generate a signal to maintain transmission between the first device and the second device, in response to the interference.

7. The system of claim 1, wherein the two wireless technologies are at least two of Bluetooth, Wi-Fi, and other known wireless technologies.

8. The system of claim 1, wherein the blended signal generates a greater bandwidth for data transmission between the first and second device based on the use of two wireless technologies than a bandwidth generated by one wireless technology.

9. The system of claim 1, wherein the controller is communicatively connected to a third device having two wireless technologies.

10. The system of claim 1, wherein the third device is a smart device.

11. A method for combining and transmitting two signals from two wireless technologies employing a first device, a second device, and user interface, the method comprising:

selecting two wireless technologies for data transmission;

combining two signals generated from the wireless technologies into a single blended signal based on the selection of the two wireless technologies via the controller, and transmitting data between the first device and the second device via the single blended signal.

12. The method of claim 11, the method further comprising selecting the data to be transmitted between the first device and the second device.

13. The method of claim 11, the method further comprising substituting the blended signal with a signal generated from one of the two wireless technologies to prevent system failure when the other wireless technology experiences interference.

14. The method of claim 11, the method further comprising parsing and encrypting the data to be transmitted with respect to the two signals.

15. The method of claim 11, further comprising receiving the data via the blended signal.

16. The method of claim 11, further comprising compiling and decrypting the data received via the blended signal.

17. The method of claim 11, wherein the two wireless technologies are Bluetooth and Wi-Fi.

18. The method of claim 11, wherein the two wireless technologies are Bluetooth and another known wireless technologies.

19. The method of claim 11, wherein the two wireless technologies are Wi-Fi and other known wireless technologies.

\* \* \* \* \*